United States Patent Office 2,712,490
Patented July 5, 1955

2,712,490

PROCESS FOR SPINNING SWOLLEN POLYVINYL CHLORIDE

René Emile Fernand Stuchlik, Villeurbanne, France, assignor to Societe Rhodiaceta, Paris, France No Drawing. Application June 22, 1950,
Serial No. 169,770

12 Claims. (Cl. 18—54)

This invention relates to a process for spinning vinyl chloride polymers and it has particular relation to a process in which said polymers are subjected to spinning in a mixture with liquids or a mixture of liquids which are non-solvents for said polymers.

The main object of the present invention is to provide a process in which vinyl chloride polymers are converted into filaments, threads, fibers and the like by dry-spinning of a substantially homogeneous mixture containing said polymers in swollen condition.

Another object of this invention is to provide a process by which vinyl chloride polymers which are scarcely soluble or insoluble owing to their high molecular weight, can be converted into threads, fibers, filaments or the like having excellent mechanical properties.

Further objects and the advantages of the invention will be apparent from the appended claims and the following specification which describes, by way of example, some embodiments of the invention.

It has been known to convert polymers of vinyl chloride into filaments, threads, bristles, fibers and similar articles by extrusion of solutions or gels of said polymers in more or less volatile solvents. It is an accepted view in this art that a liquid is the more suitable for this type of operation, the better solvent it is. In microscopic examination, such solutions are optically homogeneous and remain so after dilution with the solvent used in their preparation.

The present invention relates to a process for spinning vinyl chloride polymers and is characterized by the fact that instead of a liquid solvent used according to the prior art, as an adjuvant of spinning, a liquid having a swelling effect is used, which is a non-solvent and is capable of being absorbed at the rate of at least 100% by weight by the polymer, without the occurrence of separation by decantation. For the sake of convenience, a liquid meeting these requirements is denoted in the following an "active liquid."

The vinyl chloride polymers subjected to swelling in active liquids may present to the eye an appearance similar to that of a gel. However, they are distinguished from the latter by their appearance in microscopic examination which permits to observe their granulation and also by the fact that upon diluting them with a sufficient amount of the liquid used, separation into two phases is easily obtained by decantation.

The behavior of a certain liquid toward vinyl chloride polymers depends substantially on the conditions under which their polymerization was carried out. It is, therefore, not possible to classify in an absolute manner the various liquids as solvents, active liquids and inactive liquids. But it is very easy to find out whether a specific liquid is "active" with regard to a specific polymer. It is sufficient to disperse the polymer in a large amount of the liquid in question and to determine after decantation whether the liquid retained in the swollen product corresponds to the above mentioned condition. It has been found that certain mixtures of solvents with inactive liquids or even mixtures of two or more inactive liquids may be active liquids, while, on the other hand, certain mixtures of active liquids may be solvents.

The present invention is carried out by supplying to extrusion orifices a vinyl chloride polymer subjected to swelling by an active liquid, forcing this swollen polymer through said orifices, bringing it simultaneously to a temperature above the boiling point of the active liquid and applying to it a higher pressure than that of the vapor of said liquid at this temperature, and removing the active liquid from the extruded filaments immediately after their formation, by evaporation or by diffusion in a liquid.

It has been found that if the spinning device is supplied with a polymer in the condition of maximum swelling and containing by capillarity a supplemental amount of the active liquid, this excess of the active liquid separates during extrusion and causes frequent rupture of the filaments.

Therefore, the preferred procedure consists in using the active liquid at most in an amount equal to that which the polymer used is capable of retaining by swelling.

In the case of using a liquid which is not a simple chemical product, but a mixture of two or more components, the term "boiling temperature of the liquid" denotes the temperature at which boiling starts. This may be the boiling temperature of the lightest ingredient, or an intermediate temperature between the boiling temperatures of the various ingredients, or, in the case of certain azeotropic mixtures, a temperature which is lower than the boiling temperature of the lightest ingredient or higher than that of the heaviest ingredient.

The vinyl chloride polymers which are used in carrying out the present invention can be prepared in any known manner.

The process of the present invention is of considerable interest because it permits the conversion into filaments, threads, bristles, fibers, kemps, straws and the like, of polymers which are known to be scarcely soluble or insoluble in view of their very high molecular weight. This last mentioned fact is of particular interest because it is well known that polymers of the highest molecular weight have the best mechanical properties. Moreover, the present process considerably widens the selection of liquids which can be used in spinning.

It has been found that the polymers subjected to the before-described swelling treatment acquire a plasticity which permits them to be passed easily through pipes by means of pumps or other suitable devices and even to subject them to filtration when their granulation is sufficiently fine.

The swollen polymers may be mixed with any suitable product in order to modify the appearance or properties of the threads, filaments or the like, obtained; for example plasticizers, coloring agents, pigments, stabilizers, anti-static agents, and various fillers may be added.

The following examples serve to illustrate some embodiments of the invention without limiting it in any respect.

*Example I.*—The starting material is a polyvinyl chloride having a molecular weight of 20,000, calculated by Staudinger's formula $$\frac{\eta_{sp}}{c} = Km.M$$

$\eta_{sp}$ is the specific viscosity measured at 20° C. of a solution of 2 g./litre of the polymer in a solvent consisting of equal volumes of acetone and carbon disulfide. $Km$ is a constant of the solvent amounting to $2.7.10^{-4}$; $c$ is the concentration in grams per liter and $M$ the degree of polymerization.

This polymer does not dissolve in trichloroethylene even at boiling temperature. It is capable of absorbing 3.2 times its weight of trichloroethylene at ordinary room temperature without showing decantation after a storage of several days.

25 kg. of this polymer are mashed with 75 kg. of trichloroethylene. A whitish mash resembling mashed potatoes is thus obtained. This mass is filtered through devices of such fineness that they retain impurities but permit granules of the polymer to pass. It is then supplied to the upper part of a dry spinning device which consists substantially of a heater, a spinning device and a heated chamber.

In the heater the mass is brought to a temperature of 120° C. and is then caused under a pressure of about 30 kg./cm.$^2$ to pass a spinning plate provided with 72 apertures of 0.10 mm. diameter.

The thread emerging from the bottom of the spinning cell passes over an oiling apparatus and is then collected on the winding device at a speed of 150 m. per minute. Its count is 1200 deniers.

This thread is subsequently subjected to a drawing treatment of 520% in the manner customary in the manufacture of polyvinyl chloride threads. After having undergone this drawing, the thread has an excellent resistance to rupture. Similar results are obtained by using, instead of trichloroethylene, tetrachlor-ethane, chloroform, methylene chloride which are "active liquids" within the meaning defined above, while carbon tetrachloride and perchlor-ethylene, which are not "active liquids," do not permit spinning.

*Example II.*—The starting material is polyvinyl chloride having a molecular weight of 50,000 calculated by Staudinger's formula. This polymer does not dissolve in acetone even at boiling temperature. It is capable of absorbing 3 times its weight of acetone by swelling, without decantation, at ordinary room temperature.

23 kg. of this polymer are malaxated at ordinary room temperature with 67 kg. of acetone until a whitish, translucent paste is obtained, which when observed by microscope occurs as being composed of an infinity of swollen particles. This mass is filtered and then extruded at a temperature of 75° C. under a pressure of 35 kg./cm.$^2$ through a spinning plate provided with 36 holes of 0.10 mm., in a dry spinning apparatus.

After a drawing of 520% a thread having excellent mechanical properties is obtained.

Similar results are obtained by using, instead of acetone, methylethylketone or mixtures of acetone with 15–20% of carbon tetrachloride or perchlor-ethylene. Such mixtures are "active liquids" within the meaning defined above. Good results are also obtained by introducing the extruded filaments into water which extracts the acetone by diffusion in the liquid phase.

*Example III.*—The starting material is polyvinyl chloride having a molecular weight of 18,000 calculated by Staudinger's formula. 28 kg. of this polymer are malaxated at 45° C. with 72 kg. of benzene, in which the polymer does not dissolve even at boiling temperature, and the treatment is continued until a whitish mass is obtained. This paste, which can be kept for several days at this temperature without decantation, is forwarded by means of a pump to a dry spinning apparatus, in which it is extruded through a spinning plate having 24 holes of 0.08 mm., at a temperature of 100° C. under a pressure of 25 kg./cm.$^2$.

After a drawing of 520%, the threads obtained have excellent mechanical properties.

*Example IV.*—25 kg. of a vinyl chloride polymer having a molecular weight of 25,000 calculated by Staudinger's formula, are malaxated with 75 kg. of ethyl acetate in which the polymer used does not dissolve even at boiling temperature. This polymer is capable of absorbing 3 times its weight of ethyl acetate at ordinary room temperature without the occurrence of decantation. The paste obtained is extruded at a temperature of 110° C. and under a pressure of 40 kg./cm.$^2$ through a spinning plate provided with 36 holes of 0.08 mm.

After a drawing of 340%, threads having excellent mechanical properties are obtained.

Similar results are obtained by using, instead of ethyl acetate, methyl acetate, butyl acetate or other organic liquids which are not esters, such as glyoxal, dioxane, methyltetrahydrofurane, etc., which are "active liquids" within the meaning defined above.

*Example V.*—The starting material is polyvinyl chloride having a molecular weight of 17,000 calculated by Staudinger's formula. This polymer absorbs by swelling at ordinary room temperature 118% of its weight of toluene, however, without being soluble in this solvent. 45 kg. of this polymer are malaxated with 53 kg. of toluol and 2 kg. of lead stearate. The mass obtained is continuously introduced into the screw of an extruder, the body of which is heated to 140° C. and its head to 130° C. and is extruded through a spinning plate provided with 10 holes of 0.5 mm. diameter. The bristles obtained are dried, then subjected to drawing of 300%, by which they attain good mechanical properties.

Similar results are obtained by using other aromatic liquids, which are "active" within the meaning defined above, such as xylol and ethylbenzol, while "inactive liquids" of saturated aliphatic hydrocarbons, or certain mixtures of aromatic and aliphatic hydrocarbons, for example a mixture of 80 volume percent of benzene and 20% of gasoline (which is absorbed by the polyvinyl chloride at a rate of 93% only) do not permit spinning.

It is to be understood that the term "vinyl chloride polymer of high molecular weight" is used in the present specification and claims to include vinyl chloride polymers which, owing to their high molecular weight, are scarcely soluble or insoluble in solvents and particularly vinyl chloride polymers having a molecular weight of 15,000 or higher, said molecular weight being calculated by Staudinger's formula, as stated above. Furthermore, the term "boiling temperature" is used in the appended claims to denote the temperature at which the swelling agent boils or, in the case of mixtures, starts to boil, as also stated above.

It will be apparent that the present invention is not limited to the steps, materials and conditions specifically described above and may be carried out with various modifications without departing from the scope of the invention as defined in the appended claims.

What is claimed is:

1. A process for converting polyvinyl chloride into spun products, said process comprising subjecting polyvinyl chloride having a molecular weight of at least 15,000 to swelling by a liquid medium which consists of a non-solvent swelling fluid for the polyvinyl chloride used as starting material in an amount which is at least equal to the weight of the polyvinyl chloride and at most equal to the maximum amount which the polyvinyl chloride can retain by swelling, causing the resulting mass to extrude through the orifices of a spinning plate at a temperature above the boiling temperature of the liquid and a higher pressure than the vapor tension of the liquid at that temperature, and subsequently removing the liquid from the extruded product.

2. A process as claimed in claim 1, in which the polyvinyl chloride has a molecular weight of about 20,000 and the swelling agent is trichloro-ethylene.

3. A process as claimed in claim 1, in which the polyvinyl chloride has a molecular weight of about 50,000 and the swelling agent is acetone.

4. A process as claimed in claim 1, in which the polyvinyl chloride has a molecular weight of about 50,000 and the swelling agent is a mixture of acetone and 15–20% of carbon tetrachloride.

5. A process as claimed in claim 1, in which the polyvinyl chloride has a molecular weight of about 50,000 and the swelling agent is a mixture of acetone and 15–20% of perchlor-ethylene.

6. A process as claimed in claim 1, in which the polyvinyl chloride has a molecular weight of about 25,000 and the swelling agent consists of ethyl acetate.

7. A process for converting polyvinyl chloride into spun products, said process comprising subjecting polyvinyl chloride having a molecular weight of at least 15,000 to swelling by a liquid medium which consists of a non-solvent swelling fluid for the polyvinyl chloride used as starting material in an amount which is at least equal to the weight of the polyvinyl chloride and at most equal to the maximum amount which the polyvinyl chloride can retain by swelling, causing the resulting mass to extrude through the orifices of a spinning plate at a temperature above the boiling temperature of the liquid and a higher pressure than the vapor tension of the liquid at that temperature, and subsequently removing the liquid from the extruded product by evaporation.

8. A process for converting polyvinyl chloride into spun products, said process comprising subjecting polyvinyl chloride having a molecular weight of at least 15,000 to swelling by a liquid medium which consists of a non-solvent swelling fluid for the polyvinyl chloride used as starting material in an amount which is at least equal to the weight of the polyvinyl chloride and at most equal to the maximum amount which the polyvinyl chloride can retain by swelling, causing the resulting mass to extrude through the orifices of a spinning plate at a temperature above the boiling temperature of the liquid and a higher pressure than the vapor tension of the liquid at that temperature, and subsequently removing the liquid from the extruded product by diffusion in a liquid medium.

9. A process as claimed in claim 1, in which the spun products are subjected to drawing.

10. A process for converting polyvinyl chloride into filaments, fibres and the like, said process comprising subjecting polyvinyl chloride having a molecular weight of at least 15,000, to swelling by a liquid medium which consists of a non-solvent fluid for the polyvinyl chloride used as starting material, said liquid being used in an amount at least equal to the weight of polyvinyl chloride and not exceeding the maximum amount which the polyvinyl chloride is capable of retaining by swelling, in order to form a mass, which has the appearance of a gel and separates into two phases upon dilution with said non-solvent liquid, and subjecting the resulting mass to spinning by causing the resulting mass to extrude through the orifices of a spinning plate at a temperature above the boiling temperature of the liquid and a higher pressure than the vapor tension of the liquid at that temperature and subsequent removal of the liquid from the extruded product.

11. A process for converting polyvinyl chloride of high molecular weight and poor solubility into filaments, fibres, threads and the like, said process comprising subjecting polyvinyl chloride having a molecular weight of at least 15,000, to swelling by a liquid medium which consists of a non-solvent fluid for the polyvinyl chloride used as starting material, said liquid being used in an amount at least equal to the weight of polyvinyl chloride and not exceeding the maximum amount which the polyvinyl chloride is capable of retaining by swelling, in order to form a mass, which has the appearance of a gel and separates into two phases upon dilution with said non-solvent liquid, and subjecting the resulting mass to spinning by causing the resulting mass to extrude through the orifices of a spinning plate at a temperature above the boiling temperature of the liquid and a higher pressure than the vapor tension of the liquid at that temperature and subsequent removal of the liquid from the extruded product.

12. A process for converting polyvinyl chloride of high molecular weight and poor solublity into filaments, fibres, threads and the like, said process comprising causing polyvinyl chloride having a molecular weight of at least 15,000, to swelling by a liquid medium which consists of a non-solvent fluid for the polyvinyl chloride used as starting material, said liquid being a mixture of liquids, and used in amount at least equal to the weight of polyvinyl chloride and not exceeding the amount which the polyvinyl chloride is capable of retaining by swelling, in order to form a mass, which has the appearance of a gel and separates into two phases upon dilution with said non-solvent liquid, and subjecting the resulting mass to spinning by causing the resulting mass to extrude through the orifices of a spinning plate at a temperature above the boiling temperature of the liquid and a higher pressure than the vapor tension of the liquid at that temperature and subsequent removal of the liquid from the extruded product.

References Cited in the file of this patent

UNITED STATES PATENTS

| Number | Name | Date |
|---|---|---|
| 1,791,009 | Ostromislensky | Feb. 3, 1931 |
| 2,353,270 | Rugeley et al. | July 11, 1944 |
| 2,420,565 | Rugeley et al. | May 13, 1947 |
| 2,427,513 | Spessard | Sept. 16, 1947 |
| 2,431,078 | Powell et al. | Nov. 18, 1947 |
| 2,517,356 | Sale | Aug. 1, 1950 |

OTHER REFERENCES

Official Digest No. 263, December 1946, pages 696–702, A New Technique in Coatings—"Vinylite" Resin Dispersions, by G. M. Powell.